United States Patent [19]
de Monet

[11] 3,744,155
[45] July 10, 1973

[54] PROCESS AND APPARATUS ESPECIALLY FOR COMMERCIAL TRANSLATIONS AND THE RESULTANT PRODUCT

[76] Inventor: George Nomine de Monet, 82 Monvilliers, Denonville, France

[22] Filed: Dec. 9, 1971

[21] Appl. No.: 206,405

[30] Foreign Application Priority Data
Dec. 16, 1970 France .............................. 7045342

[52] U.S. Cl. ................................. 35/35 R, 283/46
[51] Int. Cl. ........................................... G09b 19/06
[58] Field of Search .................... 35/35 R, 35 E, 16; 283/46

[56] References Cited
UNITED STATES PATENTS
2,950,544   8/1960   Leighton ............................. 35/35 R
3,077,666   2/1963   Kump ................................. 35/16 X FOREIGN PATENTS OR APPLICATIONS
12,735   1908   Great Britain ....................... 283/46

*Primary Examiner*—Wm. H. Grieb
*Attorney*—Greene & Durr

[57] ABSTRACT

Phrases, sentences and complete paragraphs used frequently by a sender who writes in one language in corresponding with a receiver who reads a second language, are prerecorded on properly coded cards in the second language. The cards and their contents are constructed and arranged to be mounted one after the other on a supporting sheet, the composite sheet and cards therein being adapted for copying by a commercial copying device to provide a reproduction that needs only to have a date added to provide a complete commercial letter, for example. Each coded card has an identifying code designation which is reproduced in the final letter, the code deisgnation, instead of being a drawback, is a time saver for the executive who reads the letter or its counterparts before signing.

4 Claims, 4 Drawing Figures

PROCESS AND APPARATUS ESPECIALLY FOR COMMERCIAL TRANSLATIONS AND THE RESULTANT PRODUCT

An object of the present invention is to provide a process and apparatus for translation.

One knows that the different attempts made up to now to automatically translate an original text into different languages, have not led to satisfactory results for various reasons, a principal one of which is the quasi-impossibility of respecting the rules of grammar and of syntax, an indispensable objection yet, especially when it is a question of commercial correspondence.

According to the present invention, and in order to avoid this major inconvenience, the text in the original language is divided into slices, each of which constitutes a sequence of words such as a clause, a phrase or an entire paragraph. Each sequence, correctly translated, is reported individually on the slips or cards which are then sorted according to an analogical code. They can be then selectively taken up again according to a chosen program, in order to compose, by putting them together, the translation of the original text.

Also, according to invention and to that end, the slips, in packets, are successively extracted by means of a sorter of any known type, then deposited flat and in vertical succession on a supporting sheet, for example a commercial format, in the order of their choice, to materialize the translated text. By reproducing processes, one can obtain from it any number of printings, each of which constitutes the correct translation of the corresponding passages of the original text.

The field of application of the process of the invention is naturally limited, but it is susceptible to yield great service in many domains.

The invention will be more clearly set forth in the description which follows, when considered in connection with the accompanying drawings which illustrates schematically and by way of simple explanation one form for carrying out the invention.

Figure 3:
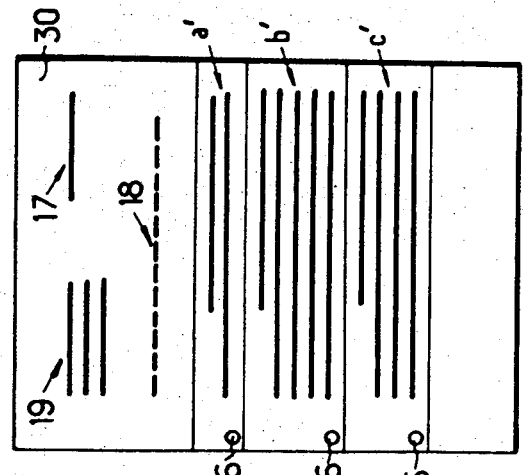
FIG. 3 shows a commercial letter in the English language obtained by reproducing the montage of FIG. 2.
Figure 2:
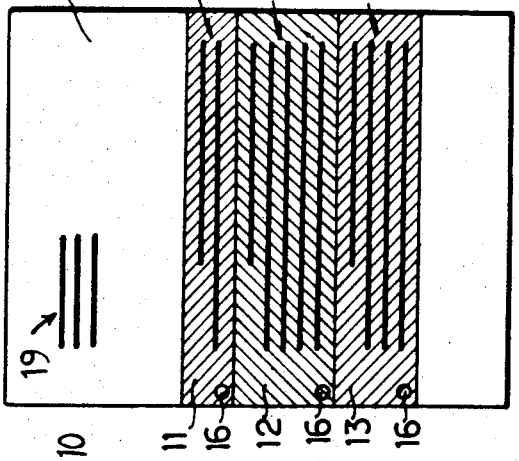
FIG. 2 shows a supporting sheet and three cards affixed thereto comprising the English translation of FIG. 1.
Figure 1:
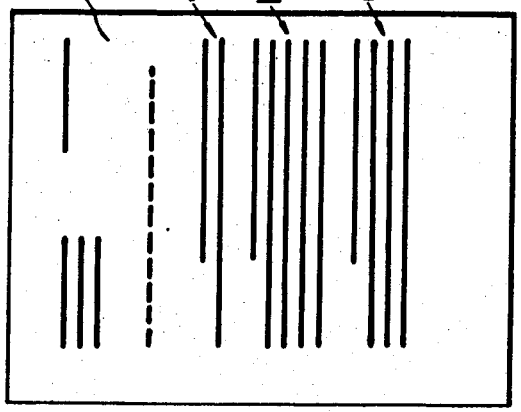
FIG. 1 represents a commercial letter, for example, in the French language, comprising three paragraphs.

The three paragraphs $a'$, $b'$, and $c'$ of the supporting sheet 20 of FIG. 2 and the letter 30 of FIG. 3 are the English translations of French paragraphs $a$, $b$, and $c$, respectively of the letter 10 of FIG. 1.

Figure 4:
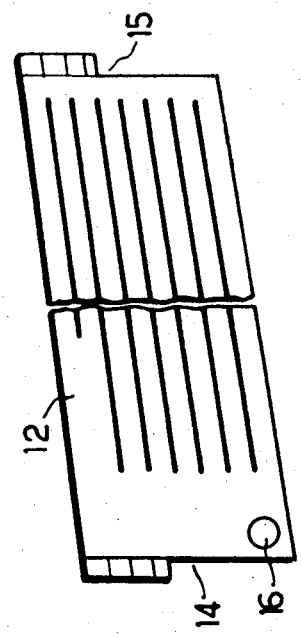
FIG. 4 shows finally in perspective and schematically a phrase carrying card utilized for carrying out the process of the invention.

Each sequence of words, $a$, $b$, $c$ in the original text of FIG. 1 is first correctly translated in the form $a'$, $b'$, $c'$, with respect to grammar and syntax. Each sequence is then entered with normal spacing on a card in such a way that the beginning and end of the sequence coincides with the upper and lower edges of the card (12 of FIG. 4, for example); the height of the cards in the same packet can vary within certain limits of course.

These cards 11, 12, 13, are destined to be sorted according to any analogical coded system, for example, a decimal system. In the example described and represented, the selection would, for example be insured by means of any sorter of known type, effective on the tabs 14, 15, arranged on the vertical borders of cards 11–13 etc., to permit the individual and successive extraction from the packet introduced in the sorter. Thus, the tabs 14, 15, can be perforated or notched, to provide a way of selecting one or more of the cards from a packet.

The cards 11, 12, 13, thus selected, are then provisionally fixed in the order determined by the program, as shown in FIG. 2, on the support 20, preferably comprising a sheet of commercial format, the longitudinal borders of the cards being made to coincide in a fashion which is practically not noticeable on the copy or copies drawn.

The heading 19 can be on the support sheet 20.

The support sheet 20 thus furnished with successive cards 11, 12, 13, is then reproduced by any known reproduction process as by photocopying, thermocopying or electrostatic printing, to give one or several prints 30 (see FIG. 3), each constituting a faithful and gramatically correct translation of the original of FIG. 1.

It suffices to add the date 17 and the subject 18, for example, to complete a commercial letter.

The slips 11, 12, 13, will then be detached from support 20 to be reclassified until their next use.

One will observe that the copies 30 obtained have a reference code 16 thereon which is carried over from the cards 11, 12, 13, but this does not present any inconvenience. On the contrary, these references present an important savings in time to the signer, the reader of the text having only to control the choice and the succession of the coded references which is naturally identical to the reproduced original, without requiring rereading each fraction of the letter. An appreciable savings of time is thus realized by the upper echelon in checking what has been dictated before signing the correspondence.

Thus, the commercial letter of FIG. 1 is composed, for example, of three paragraphs $a,b,c$. In utilizing a repertoire of an appropriate code, it has been simply dictated from the beginning in the form (or program):

A–1, B–7, C–3 — (A–1, B–7 and C–3, being the code numbers of certain cards, for example).

The packet of cards containing the cards identified by these code references are then placed in the sorter, with a view of following the process above specified.

Experience has shown that the number of cards to provide for commercial translations is relatively limited, and that a collection of 180–200 cards practically cover the field of current commercial correspondence, each with guaranteed grammatically correct translations.

It can be seen that the collection of cards can be constituted for special correspondence for certain professions, indeed for certain particular techniques. On can thus provide special cards corresponding to personal notes of the user.

Finally if the one destined to receive the letter has the code utilized by the sender, telegrams equivalent to the complete letters can advantageously comprise only the succession of code references.

I claim:

1. A process of translation especially useful in commercial transactions of the type wherein certain phrases, clauses and paragraphs are repeatedly used, comprising providing a series of cards or slips each of uniform width, recording translations to a second language of repeatedly used phrases, clauses and paragraphs on said cards or slips between uniform predetermined margins of the latter, the length of the cards corresponding to the length required to record such phrase, clause or paragraph, providing a supporting sheet adapted to receive a plurality of said cards or slips in a sequence, said supporting sheet having side edges adapted to coincide with the side edges of said cards or slips placed thereon, selecting a sequence of cards or slips in accordance with a predetermined choice and temporarily mounting them on the supporting sheet and reproducing the montage of supporting sheet and cards to provide the complete translation desired.

2. The process as claimed in claim 1 wherein each of said cards or slips contains a code designation which is reproduced in the final reproduction.

3. The process as claimed in claim 1 comprising providing each of said cards or slips with side tabs adapted to contain means to provide for ready selection of one or more of said cards.

4. A combination device for providing language translations of documents such as commercial letters wherein certain phrases, clauses and paragraphs are repeated from letter to letter, comprising a series of cards of uniform width, each of said cards containing a record of a translation of a repeatedly used phrase, clause or paragraph and code designation, the height of each of the separate cards being such that the recorded translation thereof begins at the top portion and ends at the lower portion in combination with a supporting sheet adapted to receive a series of said cards in sequence to provide a translation of a series of phrases, clauses and paragraphs, the side margins of said supporting sheet being constructed to coincide with the side margins of said cards whereby said supporting sheet containing a montage of a preselected series of said cards provides a desired translation which may be reproduced on a commercial copying machine.

\* \* \* \* \*